United States Patent
Staerzl

(10) Patent No.: US 7,924,164 B1
(45) Date of Patent: Apr. 12, 2011

(54) METHOD FOR SENSING THE PRESENCE OF A HUMAN BODY PART WITHIN A REGION OF A MACHINE TOOL

(75) Inventor: Richard E. Staerzl, Fond du Lac, WI (US)

(73) Assignee: Brunswick Corporation, Lake Forest, IL (US)

( * ) Notice: Subject to any disclaimer, the term of this patent is extended or adjusted under 35 U.S.C. 154(b) by 293 days.

(21) Appl. No.: 12/265,025

(22) Filed: Nov. 5, 2008

(51) Int. Cl.
*G08B 23/00* (2006.01)

(52) U.S. Cl. .................... 340/573.1; 340/680; 340/541; 340/686.6; 192/129 R; 192/130

(58) Field of Classification Search ............... 340/573.1, 340/680, 679, 541, 686.5, 686.6, 686.1, 562, 340/565; 192/125 R, 129 R, 130, 131 R; 83/62, 63, 76.1, 76.8, DIG. 1; 382/165; 250/559.04, 250/559.05, 559.12
See application file for complete search history.

(56) References Cited

U.S. PATENT DOCUMENTS

| | | | |
|---|---|---|---|
| 4,249,074 A | | 2/1981 | Zettler et al. |
| 4,907,432 A | * | 3/1990 | Maillefer ............................. 72/1 |
| 5,047,752 A | * | 9/1991 | Schorn .......................... 340/680 |
| 5,140,649 A | | 8/1992 | Kageyama |
| 5,563,581 A | * | 10/1996 | Kats ............................. 340/567 |
| 5,649,021 A | | 7/1997 | Matey et al. |
| 5,821,993 A | | 10/1998 | Robinson |
| 6,016,161 A | | 1/2000 | Robinson |
| 6,122,014 A | | 9/2000 | Panusopone et al. |
| 6,317,691 B1 | | 11/2001 | Narayan et al. |
| 6,445,817 B1 | | 9/2002 | de la Torre-Bueno |
| 6,462,811 B1 | | 10/2002 | Turner et al. |
| 6,469,734 B1 | | 10/2002 | Nichani et al. |
| 6,578,712 B2 | | 6/2003 | Lawandy et al. |
| 6,813,983 B2 | | 11/2004 | Gass et al. |
| 6,829,371 B1 | | 12/2004 | Nichani et al. |
| 6,900,728 B2 | | 5/2005 | Metzger, Jr. |
| 6,922,153 B2 | | 7/2005 | Pierga et al. |
| 6,959,631 B2 | | 11/2005 | Sako |
| 7,049,967 B2 | | 5/2006 | Grasselli et al. |
| 7,084,779 B2 | | 8/2006 | Uneyama |
| 7,167,575 B1 | | 1/2007 | Nichani et al. |
| 7,311,276 B2 | | 12/2007 | Matlin et al. |
| 7,421,315 B2 | | 9/2008 | Gass et al. |

FOREIGN PATENT DOCUMENTS

EP 1442834 11/2006

OTHER PUBLICATIONS

Principles of Television Color, http://www.cybercollege.com/tvp015.htm, Module 15, Updated: Jun. 23, 2008, pp. 1-7.

* cited by examiner

*Primary Examiner* — Toan N Pham
(74) *Attorney, Agent, or Firm* — William D. Lanyi

(57) ABSTRACT

A detection system senses the location of a preselected color within one or more monitored zones of a machine tool. If the operator of a machine tool wears a red glove, the system detects the location of the color red and defines various monitored zones through the use of synchronization signals and a time circuit. The system can take action based on the location of the particular monitored zones in which the red glove is sensed. These actions can include the sounding of a horn, the lighting of a light, or the deactivation of the machine tool.

20 Claims, 6 Drawing Sheets

METHOD FOR SENSING THE PRESENCE OF A HUMAN BODY PART WITHIN A REGION OF A MACHINE TOOL

BACKGROUND OF THE INVENTION

1. Field of the Invention

The present invention is generally related to a method for avoiding injury to the operator of a machine tool and, more particularly, to a method which detects a preselected color representing a human body part within one or more zones proximate a potential cause of injury.

2. Background of the Invention

Those skilled in the art of the design, manufacture, and use of machine tools are aware of many different techniques used to reduce the likelihood of injury to the operator of the machine tool. These techniques include many different types of sensors, shields, and barriers, which are intended to prevent various body parts from moving into contact with injury causing components of the machine tool.

U.S. Pat. No. 4,249,074, which issued to Zettler et al. on Feb. 3, 1981, describes an intrusion detector for a press brake. The system is intended for safeguarding an operator of an industrial machine such as a press brake. A light screen barrier comprises sequentially pulsed beams which are spaced far enough apart to permit penetration by a work piece without obstructing more than one beam whereas penetration by the operator's hand will obstruct at least two adjacent successfully pulsed beams.

U.S. Pat. No. 5,140,649, which issued to Kageyama on Aug. 18, 1992, describes a gradation correcting apparatus for correcting luminance signal in accordance with detected color signal. It uses histogram memories in the television image receiving machine. When color picture signals have been inputted, the picture portion having the particular color component is detected so as to digitally affect the gradation correcting operation in accordance with the color component.

U.S. Pat. No. 5,649,021, which issued to Matey et al. on Jul. 15, 1997, describes a method and system for object detection for instrument control. The device may be a cutting tool for use in surgery, or other type of device applied to transform a specific object located in a defined area. The apparatus comprises a marker having a predetermined color. The marker is applied to the specific device or tool to form a marked device. An imager generates video signals representing a to color image of the defined area. A color detector processes the imager signal to detect a range of colors in the image represented by the imager signals. The range of colors includes the predetermined color. The color detector provides an output signal representing instances of signals in the detected color range.

U.S. Pat. No. 5,821,993, which issued to Robinson on Oct. 13, 1998, describes a method and system for automatically calibrating a color camera in a machine vision system. A pair of calibration algorithms are provided for calibrating a color camera in a machine vision system. The first and most general form of the calibration algorithm requires that a calibration target be shown to a well adjusted machine vision system. The calibration target contains samples of red, green and blue. A gray level histogram is taken of each of the resulting red, green and blue images and is used to generate corresponding standard cumulative probability functions.

U.S. Pat. No. 6,016,161, which issued to Robinson on Jan. 18, 2000, describes a method and system for automatically calibrating a color based machine vision system. The system includes a color camera, a frame grabber and an illumination source wherein subsequently acquired images are processed on a pixel-by-pixel basis. After the frame grabber offsets are measured to obtain initial or offset calibration data, the camera is pointed at a target monotone patch of known reflectance such as pure white and the camera outputs for red, green and blue are determined while observing the monotone patch to obtain spatial calibration data.

U.S. Pat. No. 6,122,014, which issued to Panusopone et al. on Sep. 19, 2000, describes a modified chroma keyed technique for simple shape coding for digital video. An optimized binary keying threshold is provided for switching between a first image region (such as a background region) and a second image region (such as a foreground object) video picture.

U.S. Pat. No. 6,317,691, which issued to Narayan et al. on Nov. 13, 2001, describes a collision avoidance system utilizing machine vision taillight tracking. A vehicle-mounted sensing method and apparatus capable of monitoring the relative speed, distance, and closure rate between a sensor equipped host vehicle and a sensed target object is described. The sensor uses an electronic camera to passively collect information and to provide the information to a system that identifies objects of interest using visual clues such as color, shape, and symmetry.

U.S. Pat. No. 6,445,817, which issued to de la Torre-Bueno on Sep. 3, 2002, describes an apparatus for counting color transitions and areas in real time camera images. The system may include an input port for importing a stream of pixels in a frame. The pixels in the frame with particular colors may be counted and stored by associated counters. The frame may be loaded simultaneously into four frame memories. Each frame memory may be read out in a different pattern, for example, horizontally, vertically, diagonally, and cross-diagonally.

U.S. Pat. No. 6,462,811, which issued to Turner et al. on Oct. 8, 2002, describes an automatic circular saw tooth inspection system and method. First and second video cameras mounted on the apparatus relative to the inspection zone provide output signals representative of the images of the first and second surfaces, respectively. A computer responsive to the output signals generated by the first and second video cameras analyzes the output signals and calculates selected attributes of the surfaces presented for inspection.

U.S. Pat. No. 6,469,734, which issued to Nichani et al. on Oct. 22, 2002, describes a video safety detector with shadow elimination. The machine vision safety solution digitally filters a configurable number of time sequenced images of a viewed area to create a filtered image. A textured background is used as a static target and viewed under ambient light, or alternatively a texture is observed under infrared light.

European Patent Specification EP 1 442 834, which was filed on Jan. 30, 2004 by Minalga et al., describes a machine safety protection system. It relates to a safety system for a machine, particularly for a tool having a moving blade. The concept also relates to a system to detect when a human is in close proximity to a dangerous area of the tool.

U.S. Pat. No. 6,578,712, which issued to Lawandy et al. on Jun. 17, 2003, describes methods and apparatus employing multi-spectral imaging for the remote identification and sorting of objects. The system can be used to mark and code textiles, linens, garments, documents and packages for high speed machine identification and sorting. Specific uses include garment and textile rental operations, laundry operations, and the postal and mail sorting of documents and packages.

U.S. Pat. No. 6,813,983, which issued to Gass et al. on Nov. 9, 2004, describes a power saw with improved safety system. A miter saw having a base and an arm that pivots toward the base is disclosed. A blade is supported by the arm, and is designed to cut work pieces resting on the base when the arm and blade pivot downward. The saw includes a detection system configured to detect one or more dangerous conditions between a person and the blade, such as when a person accidentally touches the spinning blade, and the saw includes a reaction system to urge the arm and blade away from the base when the dangerous condition is detected.

U.S. Pat. No. 6,829,371, which issued to Nichani et al. on Dec. 7, 2004, describes an auto setup of a video safety curtain system. Objects within view in a training phase are detected and compared to objects detected in a run time phase. Each new image is then compared to the previously created model and a pixel oriented difference image is calculated. The difference image is then processed for segmentation features attributable to an intruder object. Alarm conditions are determined from threshold parameters related to location of the intruder objects.

U.S. Pat. No. 6,900,728, which issued to Metzger on May 31, 2005, describes a system to detect user entry into a defined danger zone. It includes a non-conducting member defining an opening therein for receiving a saw blade. The non-conducting member may comprise, for example, an insert received by an opening in the work surface or table of a table saw, scroll saw, band saw, miter saw, etc. Alternatively, it may comprise the blade guard of a radial arm saw or miter saw. A conductor sensor is situated on the non-conducting member adjacent the opening to define a danger zone near the saw blade.

U.S. Pat. No. 6,922,153, which issued to Pierga et al. on Jul. 26, 2005, describes a safety detection and protection system for power tools. The system for detecting a dangerous condition for an operator using a power tool of the type which has an exposed blade relative to a work surface and a protection system for minimizing, if not eliminating, the possibility of a user being injured by contacting the blade is described. In one preferred embodiment, a proximity detection system is capable of detecting the presence of a user near the blade of a table saw and a protection system that can either retract the blade below the work surface of the table saw or terminate the drive torque to the blade which can result in a rapid stopping of the saw blade by a work piece that is being cut.

U.S. Pat. No. 6,959,631, which issued to Sako on Nov. 1, 2005, describes a power tool. It may include a table on which a work piece is positioned. A portion of a circular blade protrudes above the table. A circular blade may be driven by a motor. The motor may be controlled by a control device. The work piece is cut by means of an operator sending the work piece positioned on an upper face of the table in the direction of the circular blade while the circular blade is being driven by the motor. The power tool may include a first radar device and a second radar device for monitoring a predetermined area in the vicinity of the circular blade.

U.S. Pat. No. 7,049,967, which issued to Grasselli et al. on May 23, 2006, describes a safety system for machine tools. It comprises a pair of gloves to be worn by the operator and provided with an outer surface of dielectric material and an electrically conductive inner surface. An alarm signal generator connected to the conductive inner surface and a processor unit connected to the metal machine members and to at least one tool via a safety circuit arranged to sense the alarm signal when the operator cuts one of the gloves on coming into contact with one of the mechanical members of the machine are provided.

U.S. Pat. No. 7,084,779, which issued to Uneyama on Aug. 1, 2006, describes a power tool. The power tool is equipped with a radar for transmitting radio waves towards an area in a vicinity of a rotating tool and for receiving reflected radio waves reflected from a radio wave reflector existing within the area. From the reflected radio waves received by the radar, a distance between the radio wave reflector and the radar, and a speed of change of that distance are calculated.

U.S. Pat. No. 7,167,575, which issued to Nichani et al. on Jan. 23, 2007, describes a video safety detector with projected pattern. A known structured lighting texture pattern is projected upon a target area. A model image of the pattern on an empty target field is stored during an initial training step. The machine vision safety solution digitally interprets a camera image of the light reflected by the objects in the target area to detect and characterize a pattern in the image.

U.S. Pat. No. 7,311,276, which issued to Matlin et al. on Dec. 25, 2007, describes a shredder with a proximity sensing system. It includes a proximity sensing system to sense the presence of a person, animal, or object near cutting elements of the shredder.

U.S. Pat. No. 7,421,315, which issued to Gass et al. on Sep. 2, 2008, describes a detection system for power equipment. A detection subsystem is adapted to detect contact between a person and a specified portion of a machine and to distinguish that contact from contact with other materials. The detection subsystem imparts an electrical signal to a specified portion of the machine, and distinguishes that contact based on a predetermined frequency response of the electrical signal. A reaction subsystem then causes a predetermined action to take place. The machine may be a power saw designed to minimize injury in the event a person accidently contacts the blade.

An article on the Internet, at http://www.cybercollege.com/tvp015.htm, provides a helpful description of how color television systems work. Beginning with a description of the electromagnetic spectrum and the effects of prisms and reflection on color, the article describes the subtractive and additive attributes of color and the effects of combining primary colors to create secondary colors. In addition to discussing various attributes of contrast, the article describes three-chip video cameras and one-chip color cameras. In addition, the article provides a good basis for understanding how the eye visualizes color.

The patents described above are hereby expressly incorporated by reference in the description of the present invention.

Certain techniques used to detect the presence of a body part, such as a hand or fingers, in a dangerous zone of a machine tool depend on the electrical characteristics of the human body. Others rely on a particular electrical characteristic of a glove worn by the operator of a machine tool. Those types of system require that the work piece and the body part have different electrical characteristics. This is not always possible. It would therefore be significantly beneficial if a system could be provided which is not adversely affected by the electrical characteristics of the work piece but which adequately detects and responds to the presence of a human body part in a danger zone of a machine tool.

SUMMARY OF THE INVENTION

A method of sensing the presence of a human body part within a predefined region of a machine tool, in accordance with a preferred embodiment of the present invention, comprises the steps of receiving a data signal which comprises one or more sensor values, identifying a first monitored zone within a viewed area, comparing each of the plurality of sensor values within the first monitored zone to a preselected color which is representative of the human body part, and responding to the preselected color being generally equal to one of the plurality of sensor values within the first monitored zone by taking a first predetermined action. Each of the plurality of sensor values is representative of a color of one of a plurality of locations within a viewed area. The first predetermined action can be the sounding of an audio alarm, the activation of a visual alarm, or the deactivation of the machine tool.

The data signal can represent the color of each of the plurality of locations in terms of its red, blue and green content. The data signal can comprise at least one synchronization signal and a series of data values sequentially separated by a predetermined time increment, wherein the position of each of the plurality of sensor values within a viewed area can be determined.

A preferred embodiment of the present invention can further comprise the step of covering at least a portion of the human body part with a material of the preselected color which is representative of the human body part. For example, the human body part can be a hand and the material can be a glove of the preselected color. In a particularly preferred embodiment of the present invention, the preselected color is representative of the color red.

A preferred embodiment of the present invention can further comprise the step of identifying a second monitored zone within the viewed area and responding to the preselected color being generally equal to one of the plurality of sensor values within the second monitored zone by taking a second predetermined action. The second monitored zone can be disposed within the first monitored zone.

A particularly preferred embodiment of the present invention can further comprise the step of determining a rate of movement of the human body part within the viewed area as a function of the time increment between sensing the preselected color being generally equal to one of the plurality of sensor values within the first monitored zone and sensing the preselected color being generally equal to one of the plurality of sensor values within the second monitored zone. It can further comprise the step of predicting the arrival of the human body part within a third monitored zone as a function of the rate of movement of the human body part and the relative positions of the first, second, and third monitored zones. The comparing step of the present invention can comprise the step of comparing the red content, blue content, and green content within each of the plurality of sensor values for each of the plurality of locations within the first monitored zone. Similar comparisons can be made with respect to the second and third monitored zones.

BRIEF DESCRIPTION OF THE DRAWINGS

The present invention will be more fully and completely understood from a reading of the description of the preferred embodiment in conjunction with the drawings, in which.

DESCRIPTION OF THE PREFERRED EMBODIMENT

Figure 2:
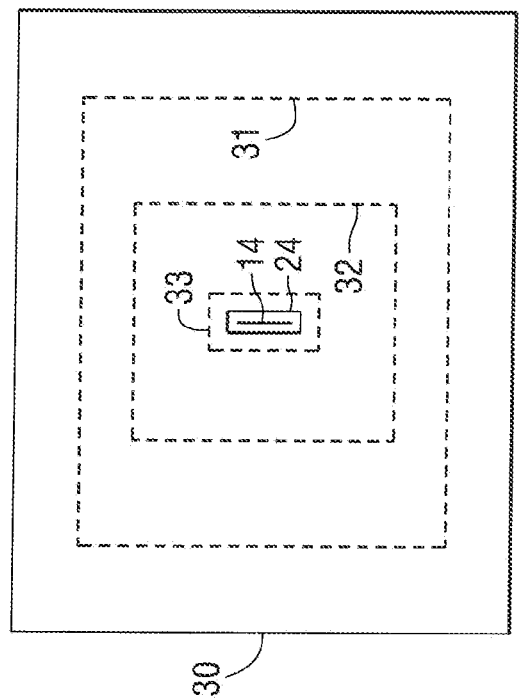
FIG. 2 shows various zones defined around the cutting edge of the band saw of FIG. 1.

Throughout the description of the preferred embodiment of the present invention, like components will be identified by like reference numerals.

Figure 1:
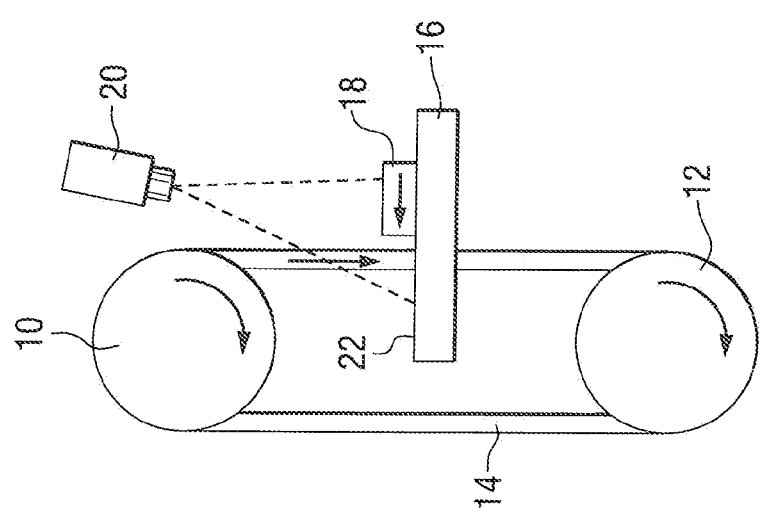
FIG. 1 is a schematic representation of a band saw.

FIG. 1 is a simplified schematic representation of a band saw which comprises two rotating wheels, 10 and 12, and a continuous cutting band 14. The band 14 extends through an opening in a support table 16 on which a work piece 18 can be maneuvered so that it is cut by the band. The rotating wheels, 10 and 12, the band 14, and the work piece 18 are movable in the directions represented by the arrows in FIG. 1. In one embodiment of the present invention, a camera 20 is positioned above the upper surface of the table 16 and directed downwardly to view a portion of that upper surface 22.

With reference to FIGS. 1 and 2, FIG. 2 shows the viewed area 30 within the observation range of the camera 20. The band 14 extends through an opening 24 formed in the upper surface 22 of the table 16. The dashed line rectangles in FIG. 2 represent first 31, second 32, and third 33 monitored zones of the upper surface 22 of the table 16. As will be described below, the three monitored zones, 31-33, are electronically defined by an electric circuit and/or within the memory of a microprocessor.

Figure 4:
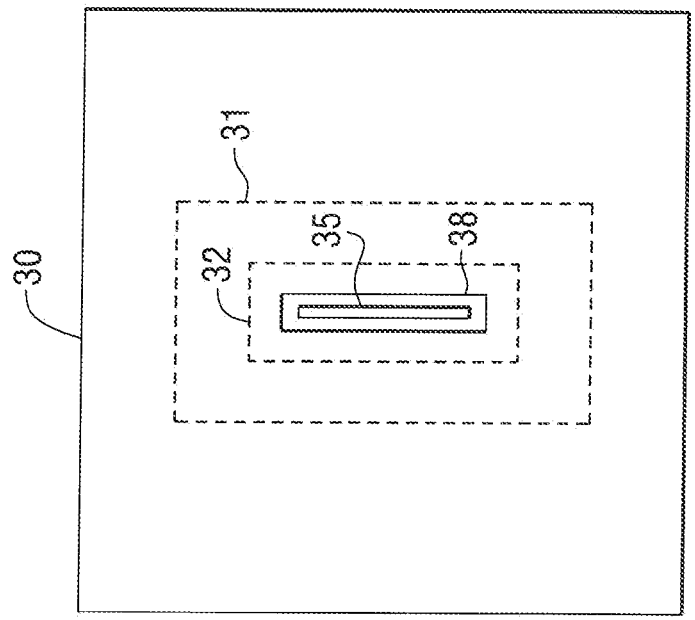
FIG. 4 shows a viewed area of the table saw of FIG. 3 in combination with two monitored zones within a viewed area of a camera.
Figure 3:
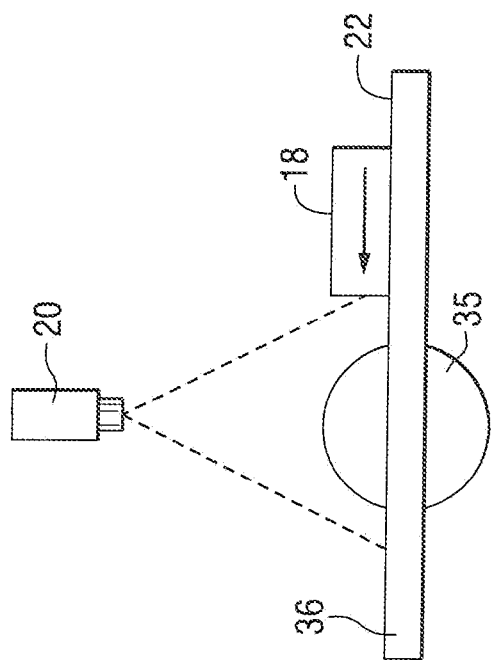
FIG. 3 shows a circular table saw.

FIG. 3 is a schematic representation of a table saw in which a rotating blade 35 extends through an opening in a table 36. As in the example described above, a work piece 18 is movable toward the rotating blade 35 and a camera 20 is disposed above the upper surface 22 of the table. FIG. 4 is generally similar to FIG. 2.

With reference to FIGS. 3 and 4, the rotating blade 35 extends through an opening 38 formed in the upper surface 22 of the table 36. The viewed area 30 is determined by the position and configuration of a camera 20. First and second monitored zones, 31 and 32, are digitally created, as will be described below, and allow the various embodiments of the present invention to react to the presence of a human body part within their geometric limits.

It should be clearly understood that many different types of color cameras are known to those skilled in the art and available for use in conjunction with the various embodiments of the present invention. Some more expensive types of color cameras provide individual red, blue and green output ports which allow easy access to digital streams of data representing the color content of various locations within a viewed area. Other less expensive cameras provide a single color output that can, nonetheless, be interrogated by an appropriate electrical circuit to separate the data stream into signals that allow each of the primary colors to be individually interrogated. In addition, many different types of color cameras provide various synchronization signals that allow a data receiving circuit to synchronize the receipt of signals with predefined positions within the viewed area. The specific type of color camera used in conjunction with the present invention and the particular circuit used to interrogate the information received from the camera should not be considered limiting to the present invention. One type of camera that can be used is identified by Model No. SO4-HNZ and is available in commercial quantities from DSP Corporation.

Figure 5:
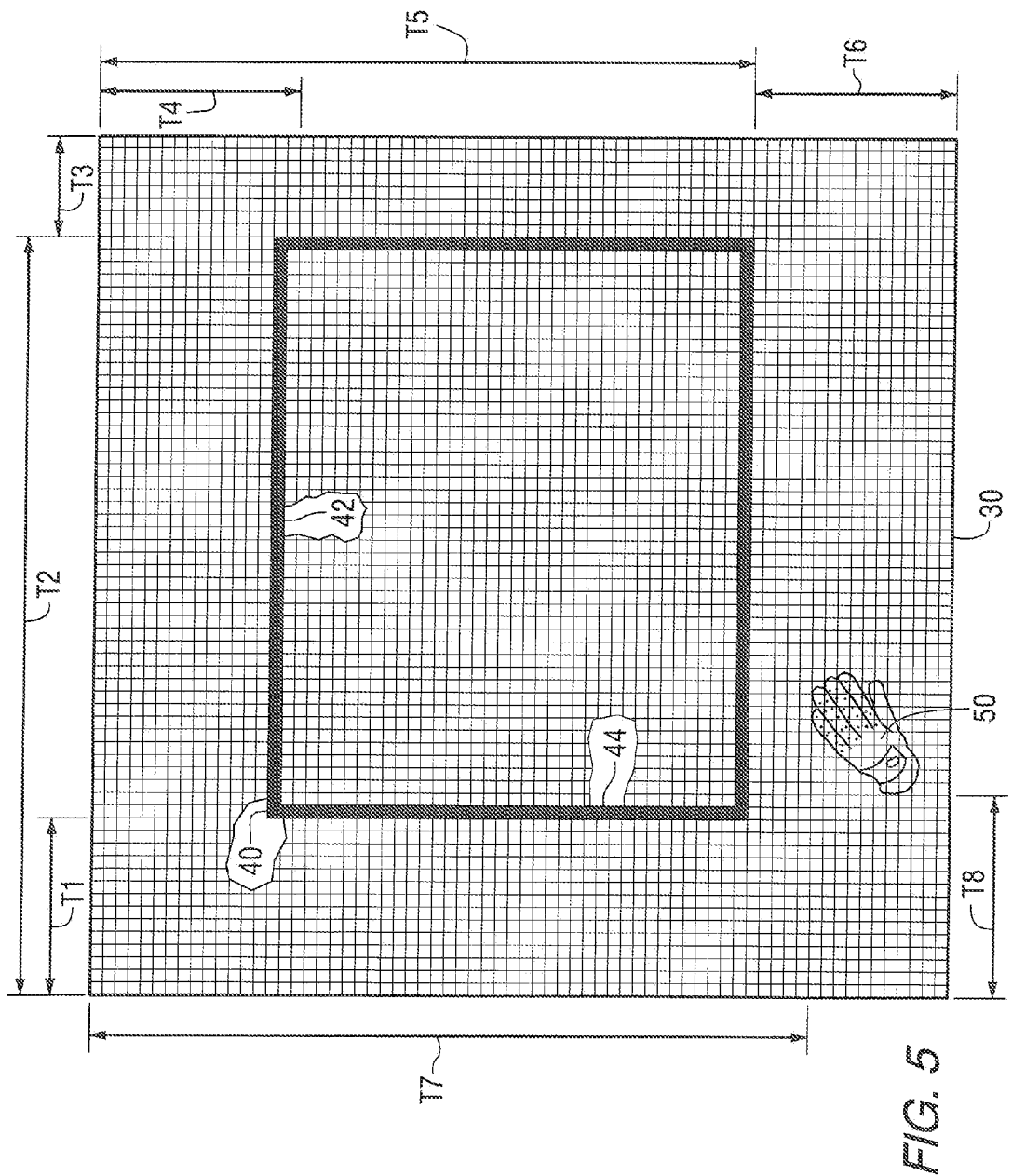
FIG. 5 illustrates the viewed area of a camera in terms of its numerous pixels and one illustrative zone box showing how timing can identify the boundaries of a monitored zone.

FIG. 5 represents a viewed area 30 which comprises a plurality of rows and columns of digitally stored and transmitted color information which is originally sensed by the camera 20 and communicated to a circuit that interrogates the information relating to the color content for each intersection of a row and column. These intersections will be generally referred to as pixels and each pixel will be considered to have red, blue, and green content that is digitally received by the camera and communicated to an appropriately configured circuit which interrogates the received signals in order to identify the color of each of the pixels. In one embodiment of the present invention, the viewed area 30 comprises 494 rows and 768 columns. As a result, a total of 379,392 pixels are contained in the viewed area. The data stream which contains the color information relating to all of these pixels is transmitted at a rate of 0.04397 microseconds per pixel. This means that each row of information takes approximately 33.76 microseconds to be received by the appropriate circuit. At the beginning of each row transmission, a synchronization pulse is transmitted from the camera in order to allow a receiving circuit to synchronize its receipt of the information to the proper row for each pixel within the data stream transmitted by the camera. As a result, a timing circuit is able to identify the particular pixel, or column and row intersection, based on the time elapsed since the most recent synchronization pulse and the cumulative number of synchronization pulses (i.e. the number of rows) that have occurred since the master synchronization pulse which indicated the beginning of transmission at the upper left extreme position of the viewed area 30. The availability of synchronization pulses for each row and the known consistent time that it takes to transmit a single row of information allows the setting of the boundaries for each of the monitored zones, 31-33, described above. In FIG. 5, numerous dimensions are shown which represent known time periods that allow the zone boundaries to be set.

With continued reference to FIG. 5, time T1 is the elapsed time period between the receipt of a synchronization pulse at the beginning of a row and the data that is coincident with the left border of the darkened zone box in FIG. 5. Similarly, time T2 represents the elapsed time from a synchronization pulse at the beginning of a row to the data that is coincident with the right border of the zone box. In a similar manner, time T3 is the elapsed time from the rightmost border of the zone box to the end of the row which immediately precedes a subsequent synchronization pulse for the next row. Time T4 represents the total elapsed time necessary for all of the data for all of the rows above the upper zone box boundary to be transmitted from the camera to the receiving circuit. Time T5 represents the total elapsed time for all of the rows down to and including the bottom border of the zone box to be transmitted from the camera to the receiving circuit. Time T6 represents the transmission time from the row immediately below the zone box to the end of transmission for the viewed area 30. As an example, from the beginning of transmission of a new series of data beginning at the upper left corner of the viewed area 30, the time before the upper left corner 40 of the zone box is transmitted would be equal to T4 plus T1. Following that occurrence, the rest of the upper boundary 42 of the zone box would take an additional transmission time equivalent to T2 minus T1. Also, after the initial synchronization pulse which occurs at the upper left corner of the viewed area 30, the bottom right corner of the zone box would be expected at a time that is equal to T5 minus T3. In this manner, the upper, lower, left and right borders of each of the zone boxes can be electronically identified and used in defining the location of various sensed components of a particular color. These techniques would be used to define the positions of the borders of the first 31, second 32, and third 33 monitored zones described above in conjunction with FIG. 2 or the first 31 and second 32 monitored zones described above in conjunction with FIG. 4.

With continued reference to FIG. 5, a glove 50 is shown within the viewed area 30. If the glove 50 is a recognizable color, its position in the viewed area 30 can be identified in a manner that is similar to that described above in conjunction with the defining of the borders of the zone box. For example, the uppermost extreme fingertip of the glove would first be sensed within the row that follows the passage of time equal to T7. In addition, the leftmost extreme portion of the glove 50 would be sensed at a time T8 following the receipt of a synchronization signal for one of the rows that could easily be identified by the use of the synchronization signals as described above. More importantly, the position of the glove 50 can be determined in relation to the position of one or more monitored zones, as represented by the zone box in FIG. 5.

Figure 6:
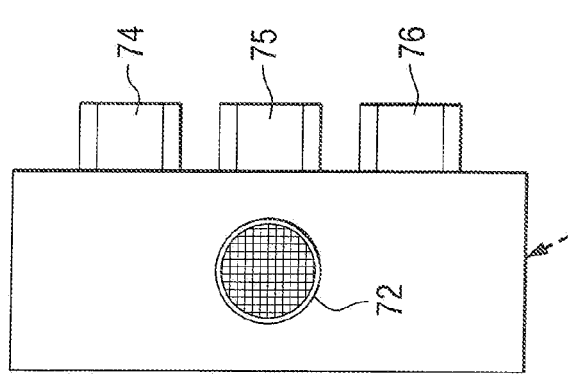
FIG. 6 is a schematic representation of a camera, a microprocessor, and an alarm system.
Figure 6:
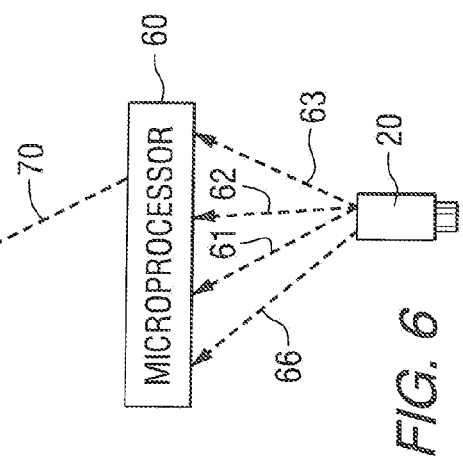

FIG. 6 is a schematic representation of the camera 20 and various signals that it provides to a microprocessor 60. As described above, the sophistication of the camera 20 will determine the availability of various types of information provided, in signal form, for use in monitoring the components within the viewed area 30 as described above in conjunction with FIGS. 2, 4 and 5. In some cases, a single output port is provided from the camera 20 and the signal received at that output port must be further manipulated in order to obtain the red, blue and green color signals. In the schematic example shown in FIG. 6, these red, blue and green signals are identified by dashed line arrows 61-63. The dashed line arrow identified by reference numeral 66 symbolically represents the synchronization signals described above. The microprocessor 60 receives the signals and performs the necessary algorithmic manipulations to determine the location of various colors in the viewed area and to define the boundaries of the various monitored zones, 31-33 as described above in conjunction with FIGS. 2 and 4. An output signal 70 from the microprocessor 60 is used to sound an audible alarm or create a visual alarm. In FIG. 6, a sound alarm is symbolically represented by speaker 72 and various degrees of light, or visual, alarms are represented by lamps 74-76. As an example, lamp 74 could possibly be a green light that indicates that an associated machine tool is being operated without a detected human body part within any monitored zone. Light 75 could be a yellow or amber light indicating that a human body part is within a monitored zone, but not in a zone which is considered to be extremely hazardous for the operator. Light 76 in FIG. 6 could represent a red light that indicates the presence of a human body part within a zone that is considered to be hazardous.

With continued reference to FIGS. 1-6, it should be understood that certain embodiments of the present invention can also take corrective actions when a hazardous condition is recognized. For example, if an operator's hand is detected within the third monitored zone 33 in FIG. 2 or the second monitored zone 32 in FIG. 4, the machine tool can be immediately turned off in order to decrease the likelihood of injury to an operator. Some devices have been developed that rapidly moves a dangerous component, such as the rotating saw wheel 35, described above in conjunction with FIG. 3, away from the human body part. One system that appears to be particularly effective for this purpose is described in U.S. Pat. No. 6,813,983 which is discussed above. When combined with such a system that is able to rapidly remove the dangerous component in a direction away from the human body part, the present invention would be used to actuate this type of device when the human body part is detected within a preselected one of the monitored zones. As an example, if an operator's hand is detected within the third monitored zone 33 described above in conjunction with FIG. 2 or in the second monitored zone 32 described above in conjunction with FIG. 4, a device such as that described in U.S. Pat. No. 6,813,983 could be activated to move the cutting edge of a blade away from the operator's hand.

Figure 7:
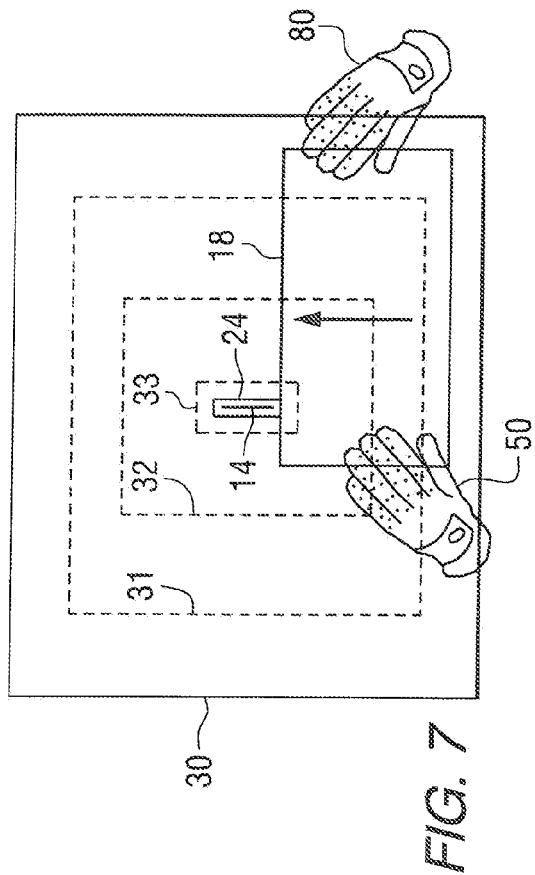
FIGS. 7 and 8 show sequential positions of an operator's glove in relation to various monitored zones in a viewed area of a machine tool.

FIG. 7 illustrates the position of an operator's left hand 50 and right hand 80 which are both provided with gloves of a particular color. In a preferred embodiment of the present invention, the left and right gloves, 50 and 80, are red in color. The three monitored zones, 31-33, in FIG. 7 are similar to those described above in conjunction with FIG. 2 and are defined in the manner described above in conjunction with FIG. 5. The operator's hands are moving the work piece 18 in a direction represented by the arrow in FIG. 7. The right hand 80 is not within any of the three monitored zones. The left hand 50 is within the first monitored zone 31 and the second monitored zone 32. This circumstance could result in the sounding of an alarm or the actuation of a light, such as the amber light 75 described above in conjunction with FIG. 6.

Figure 8:
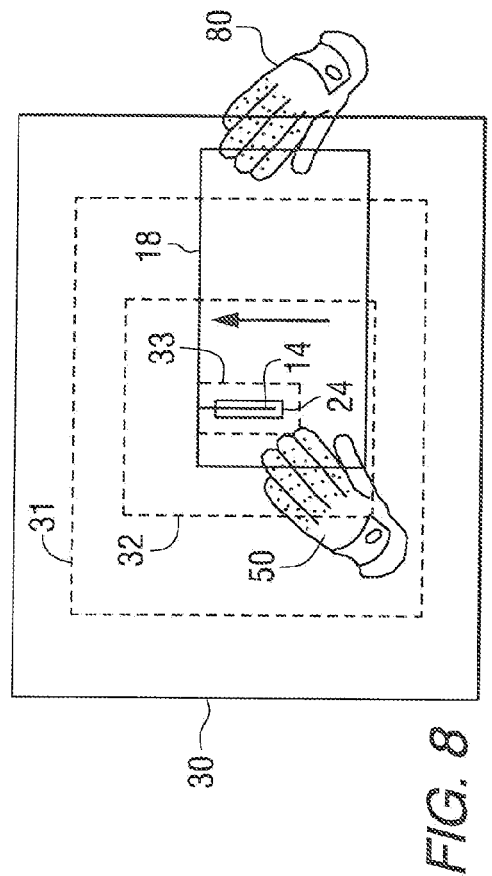

FIG. 8 is generally similar to FIG. 7, but represents an instant in time that is later than that described above in conjunction with FIG. 7. The work piece 18 has been moved forward in the direction represented by the arrow in FIG. 8 and is being cut by the blade 14. The right hand 80 is still not within any of the three monitored zones, but the left hand 50 is now within all three of the monitored zones, 31-33. At this point in time, all of the alarms would be activated and some means would be applied to stop the operation of the machine tool. As described above, those skilled in the art of machine tools are aware of known devices that can be used to rapidly move a dangerous edge or component of the machine tool away from the operator's hand. Alternatively, when power is removed from the machine tool, the cutting blade can stop of its own accord because of its frictional relationship with the work piece 18. It should be understood that the specific method used to stop the operation of the machine tool is not limiting to the present invention. On the contrary, the concepts of the present invention can be used with many different types of machine tools and the reactions taken when a human body part is detected within a danger zone can vary from one tool to the other.

Figure 9:
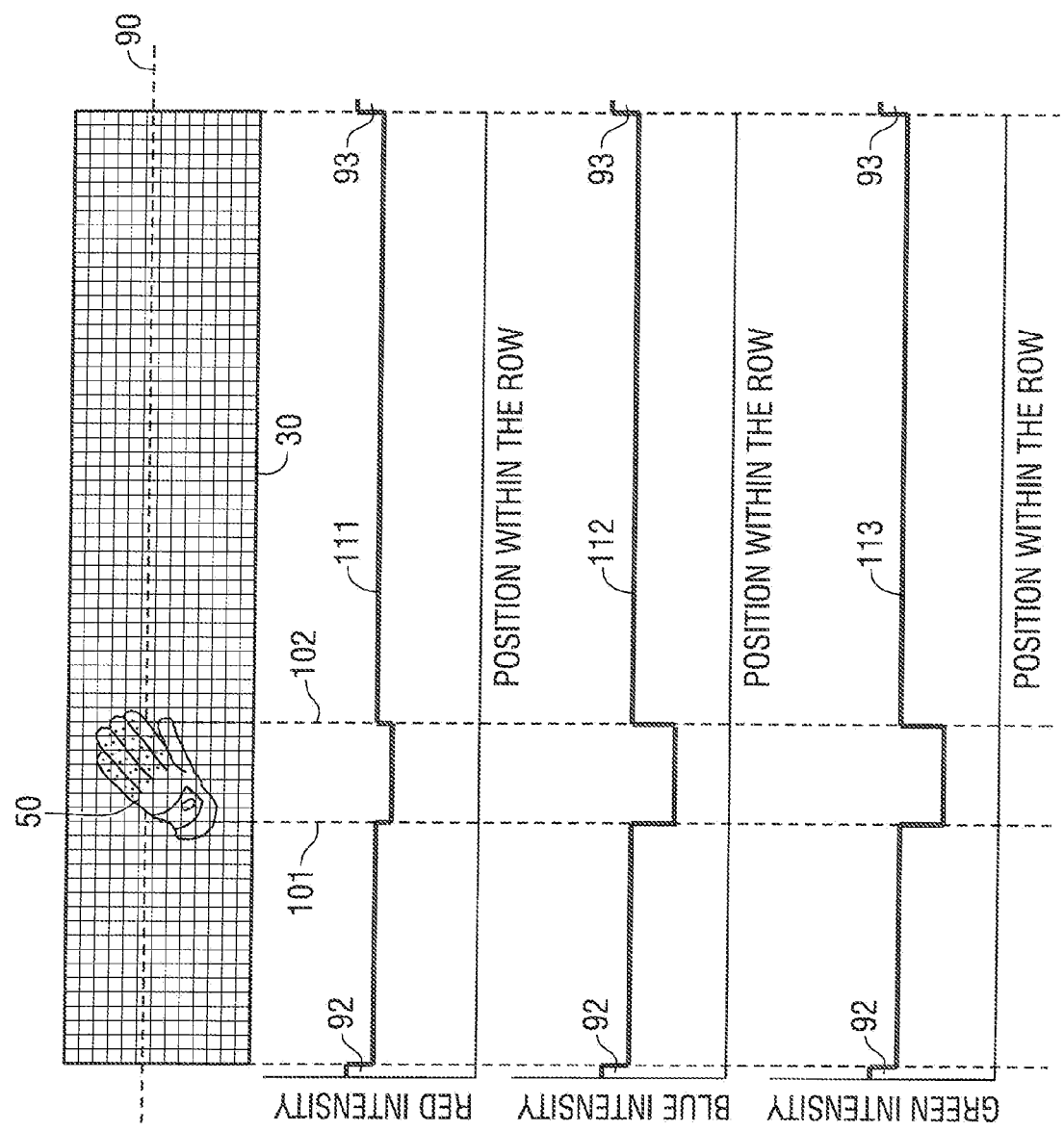
FIG. 9 illustrates how the color intensities for red, blue and green are monitored by a preferred embodiment of the present invention.

FIG. 9 is a reproduction of the lower portion of FIG. 5 and the left glove 50 is positioned similar to the location of the glove in FIG. 5 so that the basic operation of the present invention can be described. A particular row within the viewed area 30 is identified by a horizontal dashed line 90. Below the viewed area 30 in FIG. 9, three signal traces are shown in alignment with the viewed area 30. Those three signals represent the values of the pixels in the row which is coincident with dashed line 90. The signals are separated into red, blue and green color values and their intensities are represented on the vertical axes of the three graphical illustrations below the viewed area 30. It can be seen that each of the signals begins with a synchronization pulse 92 which provides notification to a receiving circuit that a new row has been addressed. The synchronization pulse 93 illustrated at the end of each of the signals in FIG. 9 is indicative of the synchronization pulse representing the beginning of the subsequent row in the viewed area 30. Therefore, the data represented by each of the signals shown in FIG. 9 is representative of the individual color intensity within the row identified by dashed line 90.

With continued reference to FIG. 9, it can be seen that dashed line 90 intersects the left glove 50 at vertical dashed line 101 and is affected by the color of the glove until dashed line 102. Between lines 101 and 102, the intensity of the red signal 111 decreases slightly in comparison to its normal level that represents white light. The blue signal 112 decreases by a greater degree than the red signal between lines 101 and 102. Similarly, the green signal 113 decreases more than the red signal 111. These magnitudes can be compared to each other in order to determine that a red colored item is within the viewed area 30. However, as will be described in greater detail below, it does not necessarily indicate that the red component is within a monitored zone.

Figure 10:
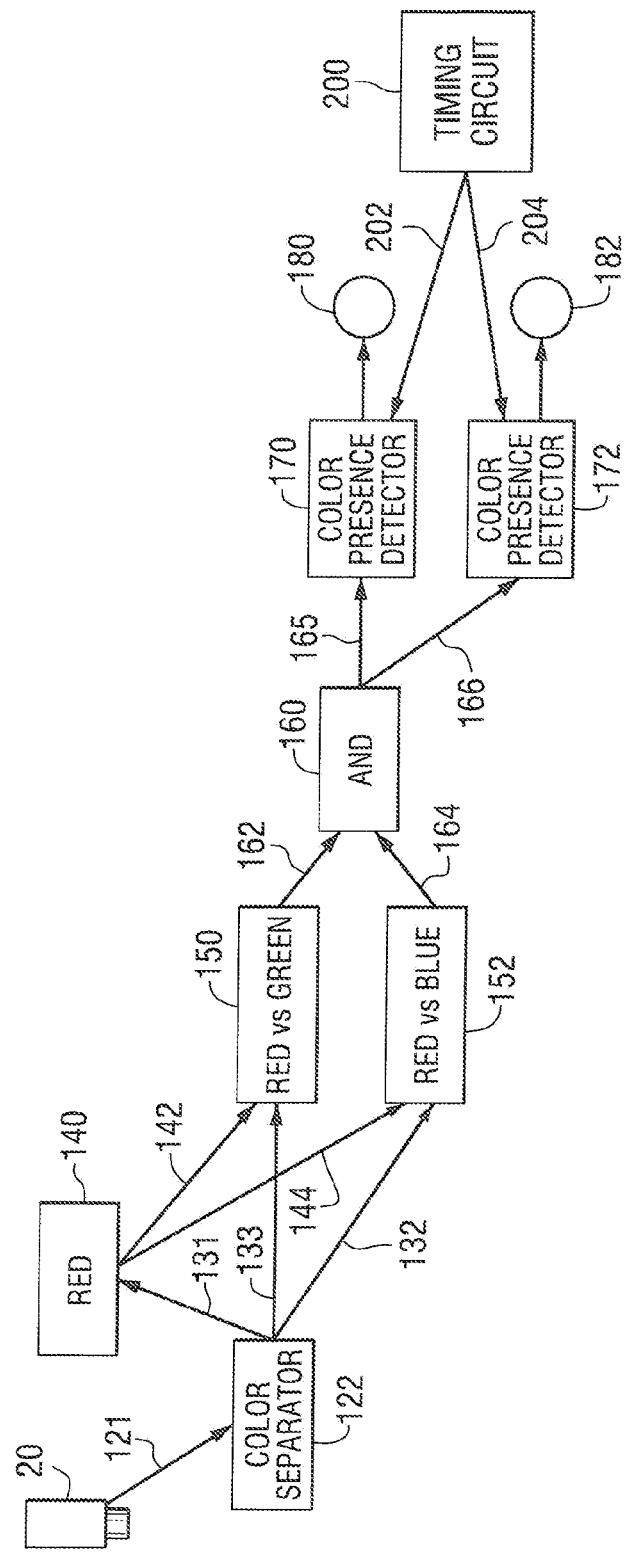
FIG. 10 is a schematic representation of a monitoring circuit used in conjunction with the present invention.

FIG. 10 is a schematic representation of a basic circuit that can be used to implement the concepts of the present invention. From the camera 20, a signal 121 zo is provided to a color separator 122 which manipulates the signal and provides three individual color signals including a red signal 131, a blue signal 132 and a green signal 133. Appropriate circuitry is used to adjust the strength of the signals so that they can be compared to each other. The red signal 131 is appropriately manipulated in this manner by circuit portion 140 and that subcircuit provides signals, on lines 142 and 144, to subcircuits which compare the red signal to the green signal and compare the red signal to the blue signal. These comparisons are made within subcircuits 150 and 152 and the results are communicated to an AND circuit 160 as represented by lines 162 and 164. If the red signal has a greater magnitude than the green signal and also has a greater magnitude than the blue signal, the output from the AND subcircuit 160 provides an indicative signal on line 165. When two or more monitored zones are used, additional output signals are provided such as the signal provided on line 166. These subcircuits, 170 and 172, are activated when the red signal magnitude is determined to be greater than both the green and blue signal magnitudes. This indicates the location of the glove 50 in the examples described above. However, it only indicates the presence of the red glove 50 within the viewed zone and does not necessarily imply that the glove 50 is within a monitored zone such as the first 31, second 32, or third 33 monitored zones described above. The timing circuit 200 is representative of the circuit used to define the boundaries of the various monitored zones as described above in conjunction with FIGS. 2, 4 and 5. If the red color is detected and this is indicated on lines 164 and 166, the appropriate actions, represented by reference numerals 180 and 182 in FIG. 10 is not taken unless the timing circuit 200 determines that the rows and columns at which the red color is detected is within one of the defined monitored zones. On lines 202 and 204, signals are provided by the timing circuit 200 to indicate that the location within the viewed area 30 that is currently being addressed by the circuitry is within one or more of the monitored zones. If this is true, the presence of color as detected by subcircuits 170 and 172 causes an action, 180 or 182, to be taken. In this way, numerous monitored zones can be used and the appropriate actions that are taken can be selected to include either an alarm or a deactivation of the machine tool.

With reference to FIGS. 1-10, it can be seen that the method for detecting the presence of a human body part within a predefined region of a machine tool, in accordance with a particularly preferred embodiment of the present invention, comprises the steps of receiving a video signal from a color camera 20 in which the video signal comprises one or more sensor values which represents the color of a plurality of locations within a viewed area, detecting the presence of a preselected color within a first monitored zone 31 within the viewed area 30, and responding to the detection of the preselected color within the first monitored zone 31 by taking a first predetermined action 180, wherein the preselected color is representative of the human body part. In a preferred embodiment of the present invention the method further comprises the step of covering at least a portion of the human body part with a material of the preselected color which is representative of the human body part. The human body part in a preferred embodiment of the present invention is a hand and the material is a portion of a red glove 50. In a particularly preferred embodiment of the present invention, the method comprises the step of receiving a data signal which comprises one or more sensor values. The sensor values, 111-113, are provided by a camera 20 and, in certain embodiments of the present invention, a color separator 122 which provides signals on lines 131-133. Another step in a preferred embodiment of the present invention is identifying a first monitored zone 31 within the viewed area 30. This step is described in detail in conjunction with FIGS. 2-5. In a preferred embodiment of the present invention it further comprises the step of comparing each of the plurality of sensor values within the first monitored zone 31 to a preselected color (e.g. red) which is representative of the human body part (such as a red glove on a hand of an operator). The preferred embodiment of the present invention further comprises the step of responding to the preselected color being generally equal to one of the plurality of sensor values within the first monitored zone 31 by taking a first predetermined action 180. As described above, the first predetermined action can be the sounding of a horn, the lighting of a light, or the deactivation of a machine tool. The data signal 121 represents the color of each of the plurality of locations in terms of its red 131, blue 132, and green 133 content. The data signal comprises at least one synchronization signal 92 and a series of data values, 111-113, sequentially separated by a predetermined time increment, or in the position of each of the plurality of sensor values within the viewed area 30 can be determined through timing methods. A preferred embodiment of the present invention further comprises the covering of at least a portion of the human body part with a material of the preselected color which is representative of the human body part. Second and third monitored zones, 32 and 33, can also be identified within the viewed area 30 and appropriate responses can be preselected in order to respond differently to each of the monitored zones. In certain embodiments of the present invention, the rate of movement of the human body part within the viewed area 30 can be determined as a function of a time increment between sensing the preselected color within one of the monitored zones a subsequent sensing of the predetermined color within another one of the monitored zones. This allows the system, particularly when a microprocessor is used, to predict the arrival of the human body part within another of the monitored zones as a function of the rate of movement of the body part and the relative positions of the first, second, and third monitored zones, 31-33. In other words, the time between the detection of the glove 50 within the first monitored zone 31 and the detection of the glove 50 within the second monitored zone 32 allows an approximately to be made of the time when the glove 50 will intersect the third monitored zone 33 as shown in FIG. 8.

Although the present invention has been described with particular specificity and illustrated to show a preferred embodiment, it should be understood that alternative embodiments are also within its scope.

I claim:

1. A method for sensing a presence of a human body part within a predefined region of a machine tool, comprising the steps of:

receiving a data signal which comprises one or more sensor values, each of said one or more sensor values being representative of a color of one of a plurality of locations within a viewed area;

identifying a first monitored zone within said viewed area;

comparing each of said one or more sensor values within said first monitored zone to a preselected color which is representative of said human body part; and responding to said preselected color being generally equal to one of said one or more sensor values within said first monitored zone by taking a first predetermined action.

2. The method of claim 1, wherein:
said data signal represents the color of each of said plurality of locations in terms of its red, blue, and green content.

3. The method of claim 1, wherein:
said data signal comprises at least one synchronization signal and a series of data values sequentially separated by a predetermined time increment, wherein a position of each of said one or more sensor values within a viewed area can be determined.

4. The method of claim 1, further comprising:
covering at least a portion of said human body part with a material of said preselected color which is representative of said human body part.

5. The method of claim 4, wherein:
said human body part is a hand and said material is a glove of said preselected color.

6. The method of claim 1, wherein:
said preselected color is representative of the color red.

7. The method of claim 1, further comprising:
identifying a second monitored zone within said viewed area;

responding to said preselected color being generally equal to one of said one or more sensor values within said second monitored zone by taking a second predetermined action.

8. The method of claim 7, wherein:
said first predetermined action comprises activating an alarm; and
said second predetermined action comprises deactivating said machine tool.

9. The method of claim 7, wherein:
said second monitored zone is disposed within said first monitored zone.

10. The method of claim 7, wherein:
said first predetermined action comprises activating a first alarm; and
said second predetermined action comprises activating a second alarm.

11. The method of claim 7, further comprising:
determining a rate of movement of said human body part within said viewed area as a function of the time increment between sensing said preselected color being generally equal to one of said one or more sensor values within said first monitored zone and sensing said preselected color being generally equal to one of said one or more sensor values within said second monitored zone.

12. The method of claim 11, further comprising:
predicting an arrival of said human body part within a third monitored zone as a function of said rate of movement of said human body part and a relative positions of said first, second, and third monitored zones.

13. The method of claim 1, wherein:
said comparing step comprises the step of comparing the red content, blue content, and green content within each of said one or more sensor values for each of said plurality of locations within said first monitored zone.

14. The method of claim 1, further comprising:
covering at least a portion of said human body part with a material of said preselected color which is representative of said human body part, said comparing step comprising the step of comparing a red content, blue content, and green content within each of one or more magnitudes the sensor values for each of said plurality of locations within said first zone.

15. A method for detecting a presence of a human body part within a predefined region of a machine tool, comprising the steps of:
receiving a signal which comprises one or more magnitudes, each of said one or more magnitudes being representative of a color of one of a plurality of locations within a viewed area;
identifying a first zone within said viewed area;
comparing each of said one or more magnitudes within said first zone to a preselected color which is representative of said human body part;
identifying the presence of at least one of said one or more magnitudes within said first zone as being generally equal to said preselected color; and
responding to said presence with a first predetermined action.

16. The method of claim 15, wherein:
each of said one or more magnitudes being representative of the color of an associated one of said plurality of locations in terms of its red, blue, and green content.

17. The method of claim 15, wherein:
said signal comprises at least one synchronization signal and a series of data values sequentially separated by a predetermined time increment, each of said data values being representative of a color of an associated one of said plurality of locations located at the intersection of a plurality of rows and a plurality of columns within said viewed area.

18. The method of claim 15, further comprising:
identifying a second zone within said viewed area;
responding to said preselected color being generally equal to one of said one or more magnitudes within said second zone by taking a second predetermined action.

19. A method for detecting a presence of a human body part within a predefined region of a machine tool, comprising the steps of:
receiving a video signal from a color camera, said video signal comprising one or more sensor values which represents a color of a plurality of locations within a viewed area;
detecting the presence of a preselected color within a first monitored zone within said viewed area; and
responding to the detection of said preselected color within said first monitored zone by taking a first predetermined action, said preselected color being representative of said human body part.

20. The method of claim 19, further comprising:
covering at least a portion of said human body part with a material of said preselected color which is representative of said human body part, said human body part being a hand and said material being a portion of a glove.

\* \* \* \* \*